(12) United States Patent
Kumar Singh et al.

(10) Patent No.: US 12,165,138 B2
(45) Date of Patent: Dec. 10, 2024

(54) APPARATUS, SYSTEM AND METHOD FOR ON-DEVICE MUTLIFACTOR AUTHENTICATION SECURITY

(71) Applicant: MASTERCARD INTERNATIONAL INCORPORATED, Purchase, NY (US)

(72) Inventors: Sachin Kumar Singh, Pune (IN); Kaushal Shetty, Thane West (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 311 days.

(21) Appl. No.: 17/708,775

(22) Filed: Mar. 30, 2022

(65) Prior Publication Data

US 2023/0316270 A1   Oct. 5, 2023

(51) Int. Cl.
*G06F 21/73* (2013.01)
*G06F 21/32* (2013.01)
*G06Q 20/38* (2012.01)

(52) U.S. Cl.
CPC ......... *G06Q 20/3821* (2013.01); *G06F 21/32* (2013.01); *G06F 21/73* (2013.01)

(58) Field of Classification Search
CPC .. G06Q 20/3821; G06Q 20/02; G06Q 20/401; G06Q 20/40145; G06Q 20/409; G06F 21/32; G06F 21/73
See application file for complete search history.

(56) References Cited

U.S. PATENT DOCUMENTS

| | | | |
|---|---|---|---|
| 10,681,207 B1 * | 6/2020 | Johnson | H04M 3/42059 |
| 11,089,160 B1 * | 8/2021 | Chen | G06Q 20/325 |
| 2004/0163011 A1 * | 8/2004 | Shaw | H04L 69/40 714/25 |
| 2014/0282945 A1 * | 9/2014 | Smith | G06F 21/62 726/6 |
| 2016/0205094 A1 * | 7/2016 | Harthattu | H04W 12/065 455/411 |
| 2016/0308859 A1 * | 10/2016 | Barry | G07C 9/22 |
| 2017/0170957 A1 * | 6/2017 | Smith | H04L 9/0877 |
| 2017/0171195 A1 * | 6/2017 | Chang | G06F 21/32 |

(Continued)

FOREIGN PATENT DOCUMENTS

WO   WO-2022154051 A1 *  7/2022

OTHER PUBLICATIONS

Ross J. Micheals et al., "Specification for WS-Biometric Devices (WS-BD)", National Institute of Standards and Technology, Published Mar. 2012 (Year: 2012).*

(Continued)

*Primary Examiner* — Chau Le
*Assistant Examiner* — Habibullah
(74) *Attorney, Agent, or Firm* — Jordan IP Law, LLC

(57) ABSTRACT

Systems, apparatuses and methods may provide for technology to store hardware details associated with a plurality of hardware components of a computing device. The technology further extracts a first hardware identifier from first authentication data received from the computing device, where the first hardware identifier is associated with a first hardware component of the computing device, and determines whether to validate the first hardware component based on a comparison of the first hardware identifier to a first hardware detail of the hardware details.

17 Claims, 8 Drawing Sheets

(56) References Cited

U.S. PATENT DOCUMENTS

| | | | |
|---|---|---|---|
| 2018/0007060 A1* | 1/2018 | Leblang | H04L 63/107 |
| 2019/0080065 A1* | 3/2019 | Sheik-Nainar | G06V 40/40 |
| 2019/0121651 A1* | 4/2019 | Eskilsson | G06F 11/3051 |
| 2019/0294772 A1* | 9/2019 | Takagi | H04L 63/0838 |
| 2020/0142330 A1* | 5/2020 | Chen | G06F 3/1222 |
| 2020/0304296 A1* | 9/2020 | Shimba | H04L 67/56 |
| 2022/0245224 A1* | 8/2022 | Rojas | G06V 40/197 |
| 2022/0391057 A1* | 12/2022 | Yu | G06F 21/31 |

OTHER PUBLICATIONS

Zhao Huang, Quan Wang, "A PUF-based unified identity verification framework for secure IoT hardware", Springer Science+ Business Media, LLC., Published: Apr. 16, 2019 (Year: 2019).*

Thuy Ong, "Hacked replacement touchscreens could hijack your smartphone", The Verge, Aug. 21, 2017, 2 pages.

Trend Micro, "The SMB Problem: PoS Malware, Skimmers, and Compromised PoS Machines", Dec. 17, 2015, 4 pages.

* cited by examiner

APPARATUS, SYSTEM AND METHOD FOR ON-DEVICE MUTLIFACTOR AUTHENTICATION SECURITY

FIELD

Exemplary embodiments relate generally to enhanced computing security, and, more particularly, to apparatuses, systems and methods for validating individual hardware components of a computing device.

BACKGROUND

Due to the advent of technology, cashless modes of payments have experienced an upward trend in use. Customers find the cashless modes of payments more convenient, as they do not have to have physical currency for making purchases. Due to the convenience offered by the cashless modes of payments to the customers and merchants, merchants may require cashless payments (or confirmation of a cashless payment) prior to consummating a transaction to ensure products and services are fully paid for prior to delivery.

Authentication protocols may be used to facilitate the cashless payments. For example, biometric details of a user may be provided to authenticate the user during a cashless payment process. If the user is authenticated, the payment process may proceed. If the user is not authenticated, the payment process is blocked, and no payment is provided. The authentication protocols may provide a layer of security that a user supposedly authorized a transaction. Such authentication protocols may still nonetheless be prone to attacks due to hardware security flaws and weaknesses.

For example, a computing device with a malicious hardware component may essentially record sensitive data (e.g., photos, application data, passwords, etc.) and use as much to generate unauthorized transactions, or direct users to phishing websites to exploit vulnerabilities and gain control of the computing device. Such attacks are difficult to detect. For example, anti-virus programs are unable to flag such attacks and the hardware survives operating system updates and factory resets. Such attacks exploit hardware vulnerabilities while the software may still be considered authentic and trusted. In light of the foregoing, there exists a need for a solution to enhance security.

SUMMARY

Various embodiments of the present disclosure provide methods and systems for managing online transactions with enhanced security and stability.

Some embodiments include a computing system comprising a network interface to receive hardware details associated with a plurality of hardware components of a computing device, and first authentication data of a user. The system further includes a processor that is configured to store the hardware details, extract a first hardware identifier from the first authentication data, wherein the first hardware identifier is associated with a first hardware component of the computing device, and determine whether to validate the first hardware component based on a comparison of the first hardware identifier to a first hardware detail of the hardware details.

Some embodiments include at least one computer readable storage medium comprising a set of instructions, which when executed by a computing system, cause the computing system to store hardware details associated with a plurality of hardware components of a computing device, extract a first hardware identifier from first authentication data received from the computing device, wherein the first hardware identifier is associated with a first hardware component of the computing device, and determine whether to validate the first hardware component based on a comparison of the first hardware identifier to a first hardware detail of the hardware details.

Some embodiments include a method comprising storing hardware details associated with a plurality of hardware components of a computing device, extracting a first hardware identifier from first authentication data received from the computing device, wherein the first hardware identifier is associated with a first hardware component of the computing device, and determining whether to validate the first hardware component based on a comparison of the first hardware identifier to a first hardware detail of the hardware details.

Other aspects and example embodiments are provided in the drawings and the detailed description that follows.

BRIEF DESCRIPTION OF THE DRAWINGS

The accompanying drawings illustrate various exemplary embodiments of systems and methods. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments are illustrated by way of example, and not limited by the appended figures, in which like references indicate similar elements, and in which.

Figure 1:
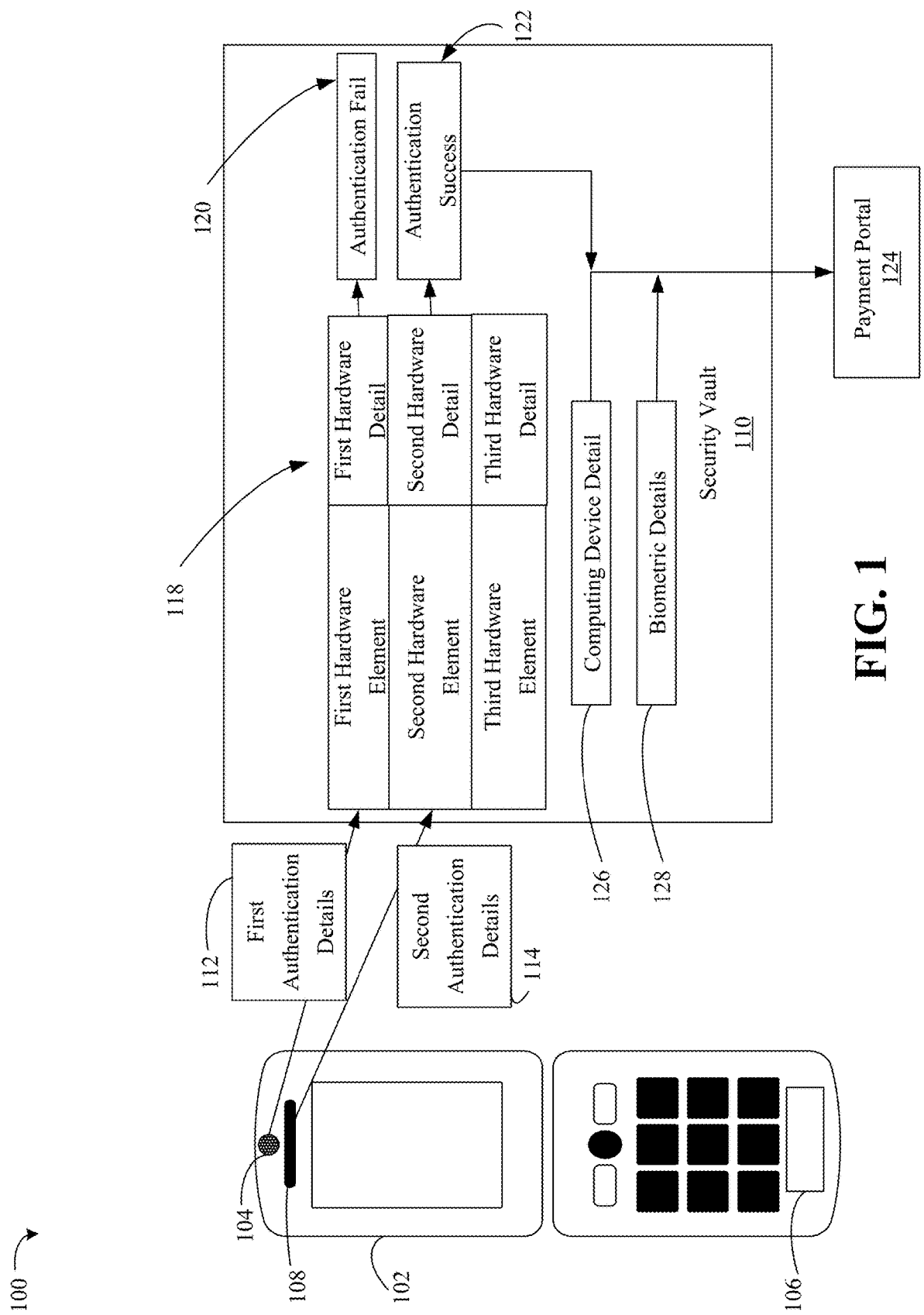
FIG. 1 illustrates a process to execute an authentication based on individual hardware components of the computing device in accordance with some embodiments.

Further areas of applicability will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

Exemplary embodiments are best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented, and the needs of a particular application may yield multiple alternate and suitable approaches to implement the functionality of any detail described herein. Therefore, any approach may extend beyond the implementation choices in the following embodiments that are described and shown.

References to "an embodiment", "another embodiment", "yet another embodiment", "one example", "another example", "yet another example", "for example" and so on, indicate that the embodiment (s) or example (s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

In various exemplary scenarios, a user may execute a payment process that requires authentication (e.g., biometric authentication). Embodiments as described herein verify the specific hardware component of a computing device (e.g., a single device, such as a mobile device, server, computing device, etc.) that captures verification details of the user (e.g., password, biometric details, etc.). Doing so may verify that the specific hardware component has not been comprised and/or replaced with a less secure or less trusted hardware component. Therefore, embodiments enhance security by ensuring that verification details originated from a secure hardware component. Moreover, other authentication protocols may require multiple verifications (e.g., two-factor authentication) to ensure that a request originated from a user.

Some embodiments may verify the specific hardware component to bypass multiple verifications while increasing efficiency and security (e.g., less processing power, less bandwidth for multiple communications, etc.). Thus, embodiments may not assume that a request that originates from a user device is necessarily authentic. Rather, some embodiments may involve a more granular approach that analyses specific hardware components of the user device to determine whether the request is authentic.

Terms Description (in Addition to Plain and Dictionary Meaning)

Server is a physical or cloud data processing system on which a server program runs. A server may be implemented in hardware or software, or a combination thereof. In one embodiment, the server includes a computer program that is executed on programmable computers, such as personal computers, laptops, or a network of computer systems. The server may correspond to a merchant server, an acquirer server, a payment network server, an issuer server, or a digital wallet server.

A vault is a secure storage location (e.g., a server) that includes a hardware table. The hardware table identifies hardware components of a user device that are authorized to conduct authentication of the user and/or retrieve authentication details from the user. The vault may validate that authentication details originate from a validated hardware device.

Merchant is an entity that offers various products and/or services in exchange of payments. The merchant may establish a merchant account with a financial institution to accept payments from several customers.

Issuer is a financial institution where accounts of several customers are established and maintained. The issuer ensures payment for authorized transactions in accordance with various payment network regulations and local legislation.

Payment network is a system or network used for the transfer of money via the use of cash-substitutes. A payment network may act as an intermediate entity between acquirers and issuers to authorize and fund transactions. Payment networks may use a variety of different protocols and procedures in order to process the transfer of money for various types of transactions. Transactions that may be performed via a payment network may include product or service purchases, credit purchases, debit transactions via cash-substitutes, which may include payment cards, letters of credit, checks, transaction accounts, etc. Examples of networks or systems configured to perform as payment networks include those operated by Mastercard®, American Express®, VISA®, Discover®, Diners Club®, and the like. A payment network may settle transactions between various acquirers and issuers, when transaction cards are used for initiating transactions. The payment network may ensure that a transaction card used by a customer for initiating a transaction is authorized. Use of the term "payment network" herein may refer to both the payment network as an entity, and the physical payment network, such as the equipment, hardware, and software comprising the payment network.

Payment gateway may be a platform to allow secure processing of payments online. For example, the payment gateway may be a platform which enables merchants to authorize and process the online transactions securely.

An acquiring bank (also known simply as an acquirer) may be a bank or financial institution that processes credit or debit card payments on behalf of a merchant.

Various exemplary embodiments have been further described in detail with reference to FIGS. 1 to 8.

FIG. 1 illustrates a process 100 to execute an authentication based on individual hardware components of the computing device 102 (e.g., a mobile device). Doing so may enhance security. For example, suppose that the computing device 102 had a faulty, original camera device that was replaced with a third-party camera device 104. Third-party may mean a party that is not an original equipment manufacturer (OEM) of the computing device 102, an untrusted party, and/or a party whose identity is not mapped to the company that manufactured the computing device 102 (e.g., the OEM).

The third-party may be able to replace of the faulty camera device with the third-party camera device, but there remains the possibility that the replacement parts for the third-party camera device 104 may contain secret hardware that infiltrates and bypasses the security of the computing device 102. In such a case, biometric authentication/on-device authentication may be compromised and protecting stored chip data or sensor data may become difficult if not impossible. Such attacks are difficult to detect as noted above.

Thus, some embodiments include a security vault 110. The security vault 110 may be a secure computing device (e.g., a server) that includes a storage location for a hardware table 118. The hardware table 118 may include a list of all original components (e.g., OEM components) of the computing device 102. The original components may include first, second and third hardware elements. For example, the first hardware element may be the original camera device, the second hardware element may be audio device 108, and the third hardware element may be a finger scanner 106. Each of the first hardware element, the second hardware element and the third hardware element may be stored in association with one of the first, second and third hardware details. For example, the first hardware element, which is the original camera device, may include a unique hardware identifier (e.g., a device unique identifier). The unique hardware identifier of the first hardware element is stored in association with the first hardware element as the first hardware detail. Similarly, the second hardware element, which is the audio device 108, may include a unique hardware identifier (e.g., a device unique identifier) that is stored in association with the second hardware element as the second hardware detail. Likewise, the third hardware element, which is the finger scanner 106 (e.g., a fingerprint scanner and/or touchpad), may include a unique hardware identifier (e.g., a device unique identifier) that is stored in association with the third hardware element as the third hardware detail.

The hardware table 118 may be generated during an initial set-up process. The security vault 110 may be operated by an OEM or original manufacturer of the computing device 102.

In the process 100, the user desires to execute a payment through the computing device 102. Thus, the user provides first authentication details 112 (e.g., biometric details such as a picture) through the third-party camera device 104. The first authentication details 112 may include a unique hardware identifier of the third-party camera device 104.

The security vault 110 receives the first authentication details 112. The security vault 110 may identify the unique hardware identifier of the third-party camera device 104. The security vault 110 may determine that the unique hardware identifier of the third-party camera device 104 does not exist in the hardware table 118 and therefore that the third-party camera device 104 is not valid. Thus, the security vault 110 generates an authentication fail 120 based on the first authentication details 112. Therefore, the first authentication details 112 are blocked from further analysis since the first authentication details 112 originated from an insecure device, or the third-party camera device 104.

In some embodiments, the security vault 110 may determine that the third-party camera device 104 has captured at least part of the first authentication data and identify the first hardware detail based on an identification of a type of the third-party camera device 104. For example, the hardware table 118 may include a column that includes an indication of types of hardware that are associated with the first, second and third hardware details. In such embodiments, the first hardware detail would be associated with a "camera type," the second hardware detail would be associated with an "audio type" and the third hardware detail may be associated with the a "fingerprint scanner." In such embodiments, the security vault 110 may determine that the first authentication details 112 are of a type (e.g., an image, movie, etc.) as being captured by a "camera type." The security vault 110 may use the "camera type" of the third-party camera device 104 to identify a corresponding entry in the hardware table 118 that matches the "camera type," which in this particular example is the first hardware detail. Based on as much, the security vault 110 may compare the first hardware detail to the first authentication details 112. Doing so may enable a more robust security system since then third-party devices may not attempt to "spoof" other devices by cloning the unique identifiers of other devices and using those unique identifiers. Furthermore, in some embodiments, the security vault 110 may determine that the third-party camera device 104 is to not be validated based on the first hardware detail being different from the unique hardware identifier.

In some embodiments, the first authentication details 112 are an encrypted transmission from the third-party camera device 104, wherein the encrypted transmission includes the unique hardware identifier. In such embodiments, the computing device 102 decrypts the encrypted transmission based on a decryption protocol associated with the third-party camera device 104, where each of the plurality of third-party camera device 104, the audio device 108 and the finger scanner 106 are associated with a different decryption protocol.

In some embodiments, the security vault 110 provides an instruction to the computing device 102 that the third-party camera device 104 is not validated and to select a different authentication protocol. In response, the user may provide second authentication details 114 (e.g., audio details such as a voice authentication) through the audio device 108. The second authentication details 114 may include the unique hardware identifier of the audio device 108.

The security vault 110 may receive the second authentication details 114 and determine that the unique hardware identifier of the second authentication details 114 corresponds to one of the entries in the hardware table 118, for example based on a type associated with the second authentication details 114. In this example, the unique hardware identifier of the second authentication details 114 may correspond (e.g., match) to the second hardware detail of the hardware table 118. Thus, the second hardware element may be deemed to be valid. As a result, the security vault 110 generates an authentication success 122. As a result, the authentication may continue based on the second authentication details 114 but not the first authentication details 112.

The security vault 110 may receive a computing device detail 126 (e.g., a unique identifier of the computing device 102) and biometric details 128. The biometric details (e.g., the audio details such as the voice authentication described above) may have been part of the second authentication details 114. The security vault 110 may provide the computing device details and biometric details to a payment portal 124 (e.g., a payment network and/or issuer) to complete the payment process. For example, the payment portal 124 may include a payment network and an issuer. The payment process may result in payment of a transaction in a secure and robust manner. In some embodiments, the hardware table 118 may further identify a chipset of the computing device 102.

Figure 2:
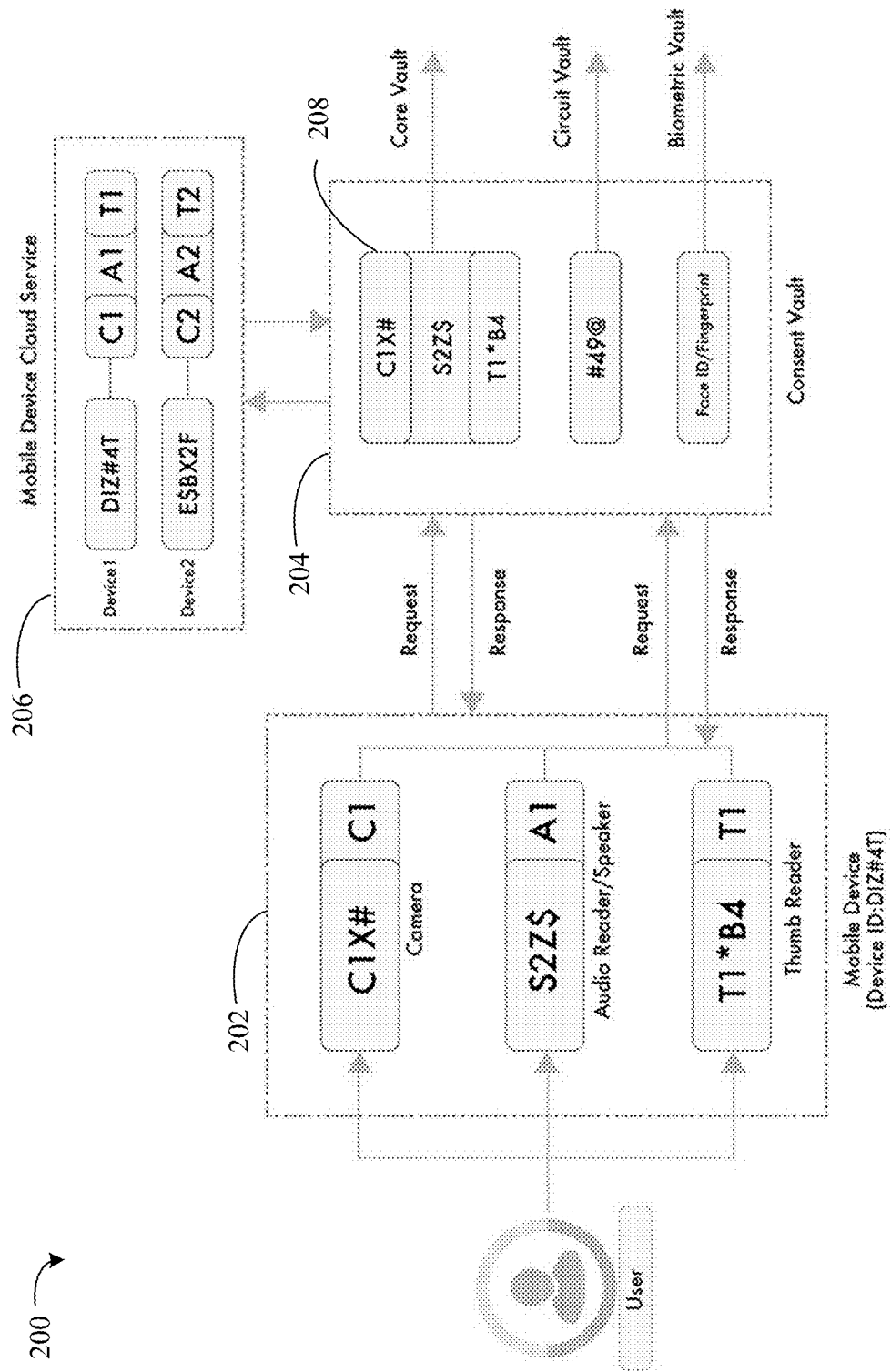
FIG. 2 is a diagram that illustrates an architecture to generate a hardware table of a computing device in accordance with some embodiments.

FIG. 2 illustrates a computing architecture 200 to register hardware elements and generate a hardware table 208 based on the hardware elements. The computing architecture 200 may readily be implemented with the process 100 of FIG. 1. In detail, a computing device 202 may include several hardware components, including a camera, audio reader/speaker and a thumb reader. Each of the hardware components may include a unique device identifier. For example, the camera may include a device identifier C1X #, the audio reader/speaker includes a device identifier S2Z$ and the thumb reader may include a device identifier T1*B4.

The computing device 202 may employ a request and response procedure with the consent vault 204 to register each of the hardware components. For example, the computing device 202 may request registration of the camera, the audio reader/speaker and thumb reader. The request may include the unique device identifiers of each of the hardware components, as well as biometric features of the user. For example, the camera may provide the device identifier of the camera and a face identification (e.g., biometric data) of the user. The audio reader/speaker may provide the unique device identifier of the audio reader/speaker and an audio signature (e.g., biometric data) of the user. The thumb reader may provide the unique device identifier of the thumb reader and fingerprint (e.g., biometric data) of the user. The consent vault 204 may then register each of unique identifiers of the camera, audio reader/speaker and thumb reader. The consent vault 204 may generate the hardware table 208 to include each of the unique device identifications. Thereafter, the consent vault 204 may reference the hardware table 208 to determine whether to validate a hardware element.

The consent vault 204 may provide the biometric data to a biometric vault. The biometric vault (e.g., a payment portal) may store the biometric data (e.g., the audio signature, the face identification of the user, the fingerprint of the user). The consent vault 204 may provide a unique identifier #49@ of the consent vault 204 to a circuit vault. In the computing architecture 200, a mobile device cloud service 206 may store a device identification in association with a device. For example, device 1 corresponds to the computing device 202. The mobile device cloud service 206 may include a list of all hardware components of the computing device 202. The mobile device cloud service 206 may include other devices as well, and as stored in association with the hardware components of the other hardware devices.

Figure 3:
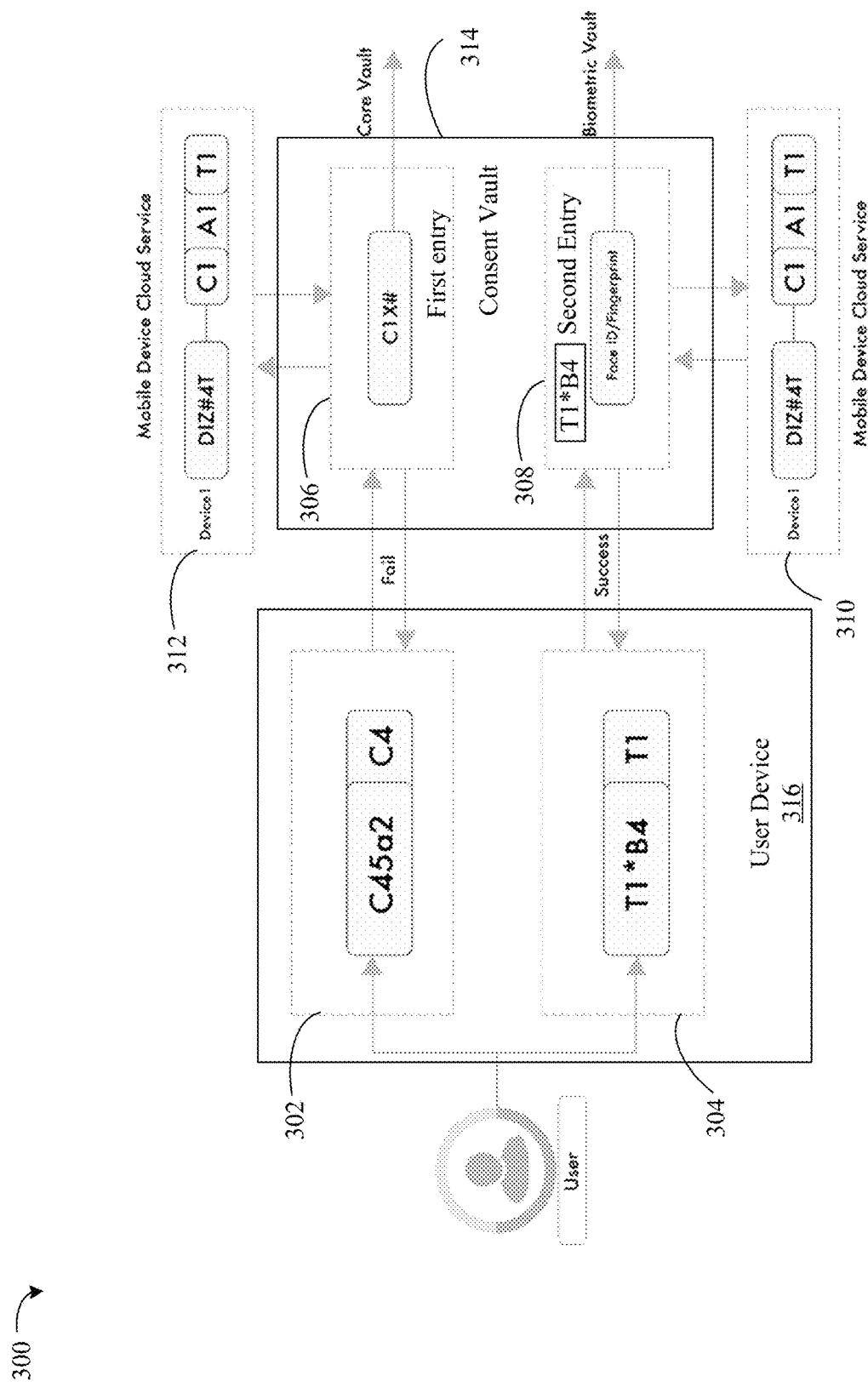
FIG. 3 is a diagram that illustrates a hardware element validation computing architecture in accordance with some embodiments.

FIG. 3 illustrates a hardware element validation computing architecture 300. The computing architecture 300 may include a first entry 306 and a second entry 308 of a consent vault 314. The first and second entries 306, 308 may be used to validate hardware elements and have been generated previously, for example by architecture 200 (FIG. 2). The architecture 200 may be readily combined with the process 100 of FIG. 1.

A user device 316 of the user may include a first hardware element 302 and a second hardware element 304. The first hardware element 302 may be a tampered facial authentication camera. The second hardware element 304 may be a genuine thumb authentication device. The first hardware element 302 is associated with a unique identifier labeled as C45a2 along with a type of C4. The type C4 may be a type of the first hardware element 302 (e.g., a model, type of data associated with first hardware element 302, etc.). The second hardware element 304 is associated with a unique identifier labeled as T1*B4 along with a type of T1. The type T1 may be a type of the second hardware element 304 (e.g., a model, type of data associated with second hardware element 304, etc.).

The consent vault 314 may receive first authentication data from the first hardware element 302. The first authentication data may include an identification of the first hardware element 302, which may be the unique identifier C45a2. The unique identifier C45a2 may be compared to the first entry 306. In this example, the unique identifier C45a2 does not match the first entry 306 (e.g., does not match the first hardware detail of C1X #). Thus, the consent vault 314 may readily identify that the first hardware element 302 is not a genuine or trustable component of the user device 316. For example, the first hardware element 302 may be a third-party component that is inserted into the user device 316 by an untrusted party after manufacture. Thus, the first authentication data may be bypassed for authentication, and may be stored in a core vault 314.

The consent vault may receive second authentication data from the second hardware element 304. The second authentication data may include an identification of the second hardware element 304, which may be the unique identifier T1*B4. The unique identifier T1*B4 may be compared to the second entry 308. In this example, the unique identifier T1*B4 matches the second entry 308. Thus, the consent vault 314 may readily identify that the second hardware element is a genuine and trustable component of the user device 316. For example, the second hardware element 304 may be an original component of the user device 316 or inserted into the user device 316 by a trusted party (e.g., the manufacturer or security verified party) after the user device 316 is manufactured. Thus, the second authentication data may be used for authentication, and biometric data of the second authentication data may be provided to a biometric vault. Mobile device cloud services 310, 312 may further provide details to the consent vault 314 as needed.

Figure 4:
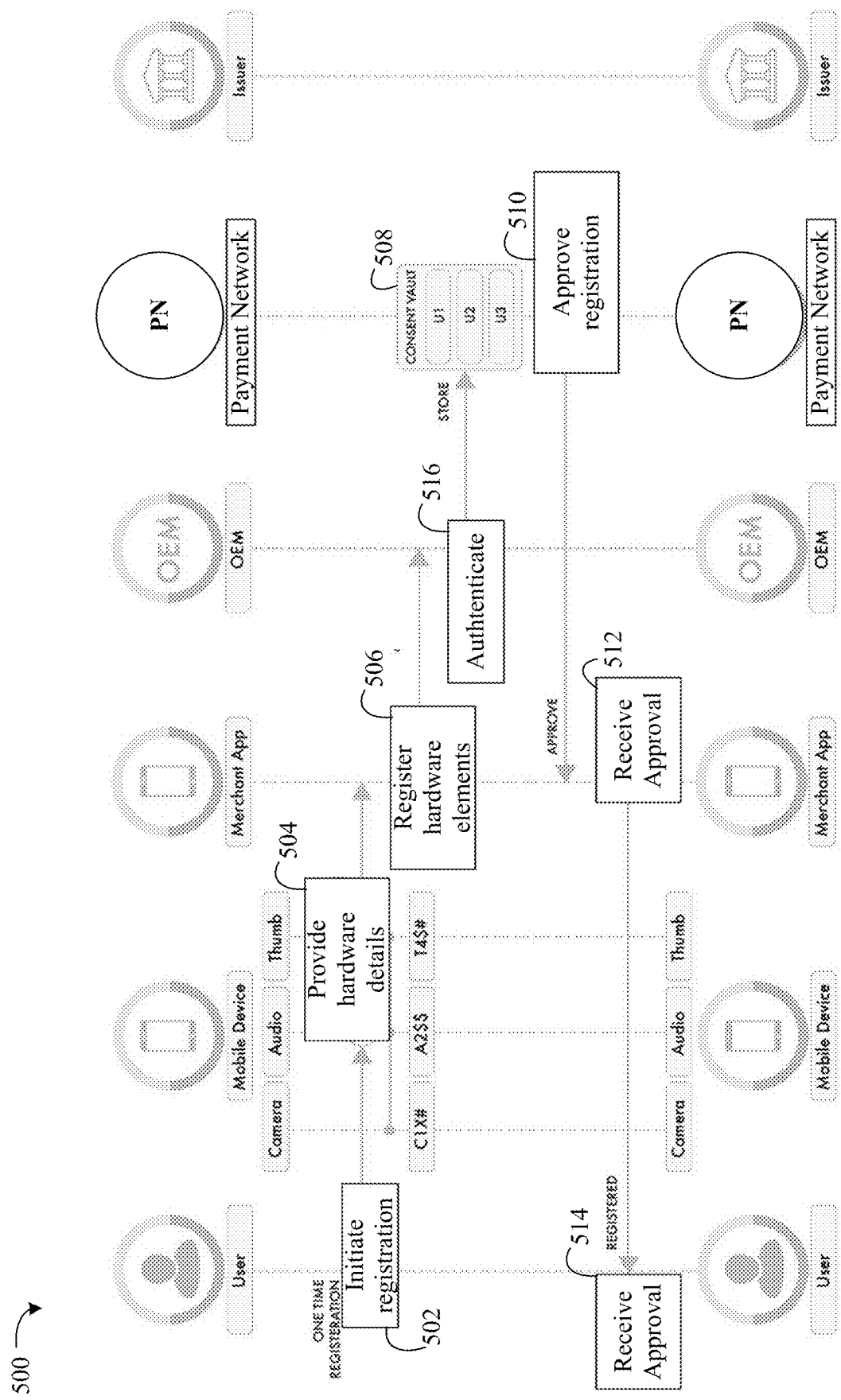
FIG. 4 is a diagram that illustrates a hardware element validation computing architecture in accordance with some embodiments.

FIG. 4 illustrates a registration process 500 to register hardware elements. The registration process 500 (e.g., a server) may readily be implemented with the process 100 of FIG. 1, the computing architecture 200 of FIG. 2 and the hardware element validation computing architecture 300 of FIG. 3. A user may initiate registration 502. For example, a mobile device may provide hardware details 504 of each of a camera device, audio device and thumb device. A merchant application may register hardware elements 506 of the mobile device. An original equipment manufacturer (OEM) authenticates 516 the device. In response, a payment network may generate a consent vault 508 that stores the hardware details. The payment network may then approve the registration 510. The merchant application may receive the approval 512 from the payment network. The user may then receive the approval 514 via the mobile device.

Figure 5:
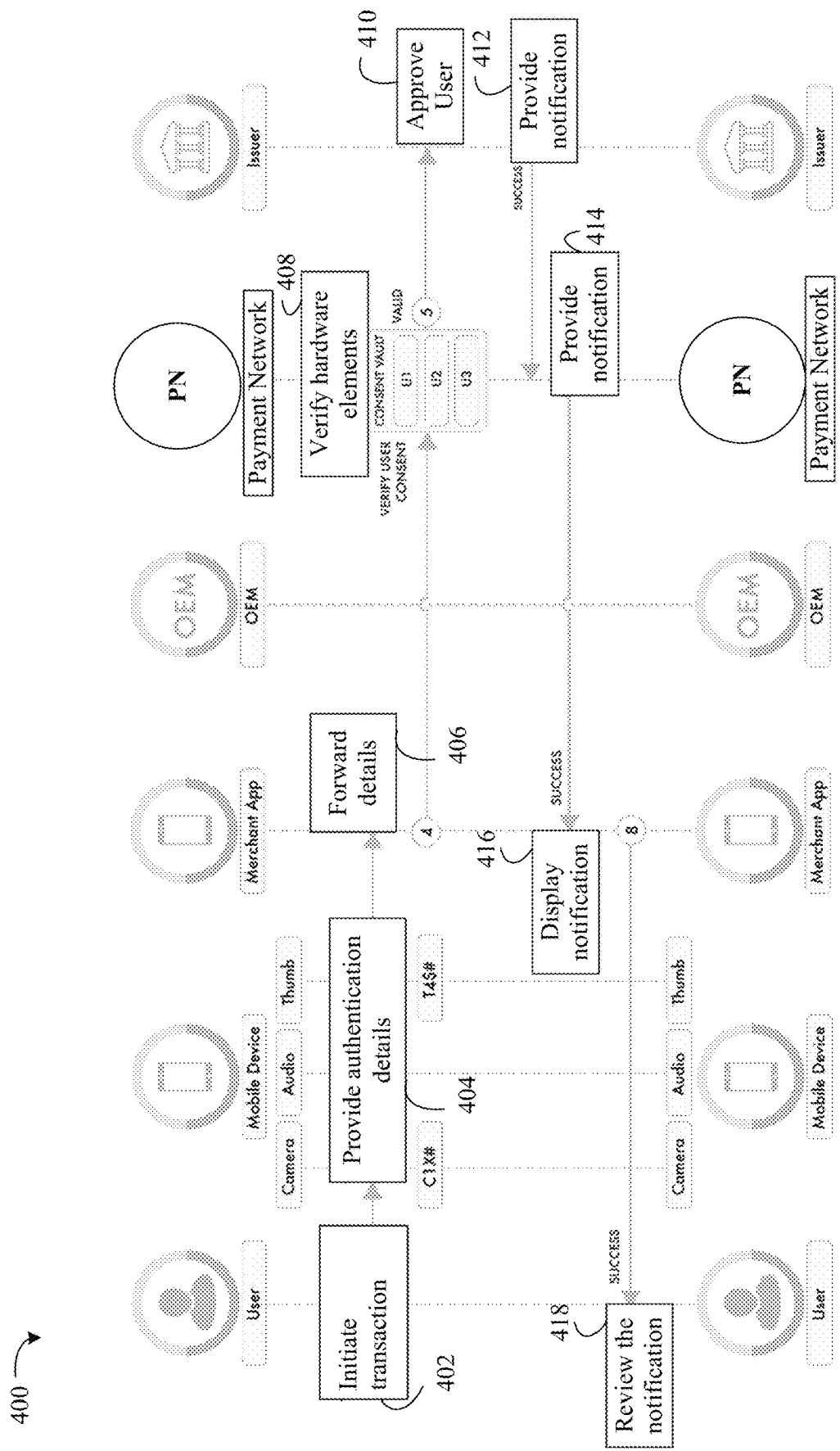
FIG. 5 illustrates a process for authentication to bypass compromised hardware in accordance with some embodiments.

FIG. 5 shows a process 400 for authentication while bypassing compromised hardware. The process 400 may readily be implemented with the process 100 of FIG. 1, the computing architecture 200 of FIG. 2, the hardware element validation computing architecture 300 of FIG. 3 and the registration process 500 of FIG. 4. Various actors may execute various functions. For example, a user may initiate a transaction 402. To do so, a mobile device may capture and provide authentication details 404 through hardware elements including a camera element, audio element and thumb reader. A merchant application may forward details 406 of the hardware elements and a biometric signature of the user.

A payment network verifies the hardware elements 408 with a consent vault. The payment network may ascertain from the authentication details that the camera element and thumb reader are compromised (e.g., not trusted parts). The payment network may determine that the audio element is trusted (e.g., an original part of the mobile device). The payment network may discard authentication details associated with the camera device and thumb device, but execute further processes based on the authentication details from the audio device. For example, the payment network may provide the authentication details of the audio device to an issuer for further authentication based on data from the audio device (e.g., biosignatures). The issuer may approve the user 410 and provide a notification 412 to the payment network. The payment network may provide the notification 414 to the merchant application, who in turn displays the notification 416 to the user. For example, the merchant application may display the notification 416 to the user via the mobile device. The user may review the notification 418.

Figure 6:
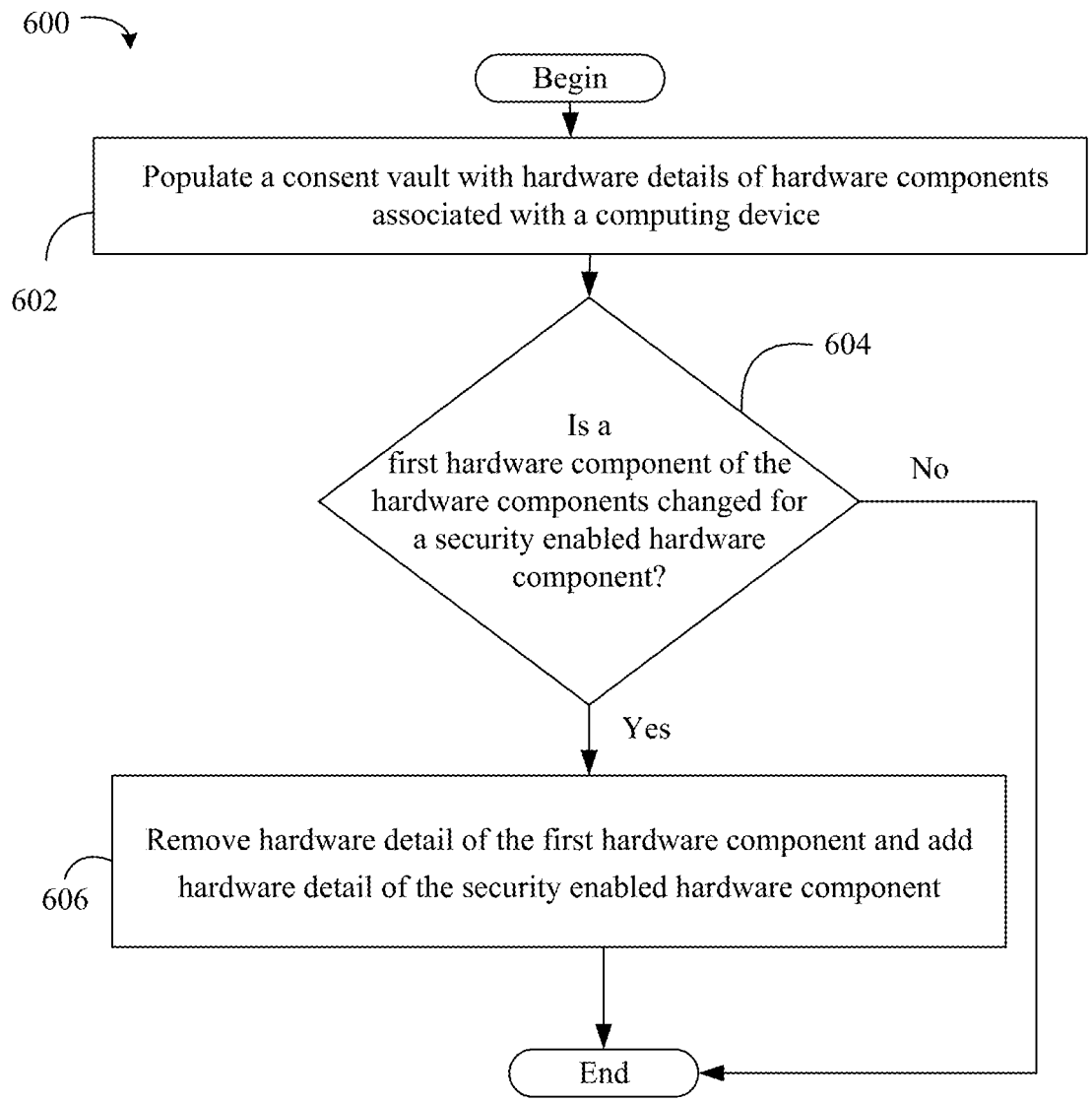
FIG. 6 illustrates a method for updating a consent vault in accordance with an embodiment in accordance with some embodiments.

FIG. 6 is a process 600 that illustrates updating a consent vault in accordance with an embodiment. The process 600 may readily be implemented with the process 100 of FIG. 1, the computing architecture 200 of FIG. 2, the hardware element validation computing architecture 300 of FIG. 3 and the registration process 500 of FIG. 4 Process 600 may be implemented in at least one computer readable storage medium comprising a set of instructions, which when executed by a computing device, cause the computing device to execute the following steps. In some embodiments, process 600 may be executed by hardware elements (e.g., circuitry, fixed-function logic hardware, configurable logic, etc.). In some embodiments, process 600 may be implemented in combinations of hardware elements and software. Process 600 may be implemented by a server for example.

Illustrated processing block 602 populates a consent vault with hardware details of hardware components associated with a computing device. Illustrated processing block 604 determines if a first hardware component of the hardware components is changed for a security enabled hardware component (e.g., a trusted component that is verified to be not tampered with). If so, illustrated processing block 606 removes hardware details of the first hardware component and adds hardware details of the security enabled hardware component to the consent vault. Otherwise, if the component is untrusted and a third-party device, the process 600 ends. Notably, if the first hardware component is replaced with a less secure device, the less secure device is not registered to the consent vault and is unable to execute sensitive authentication operations.

Figure 7:
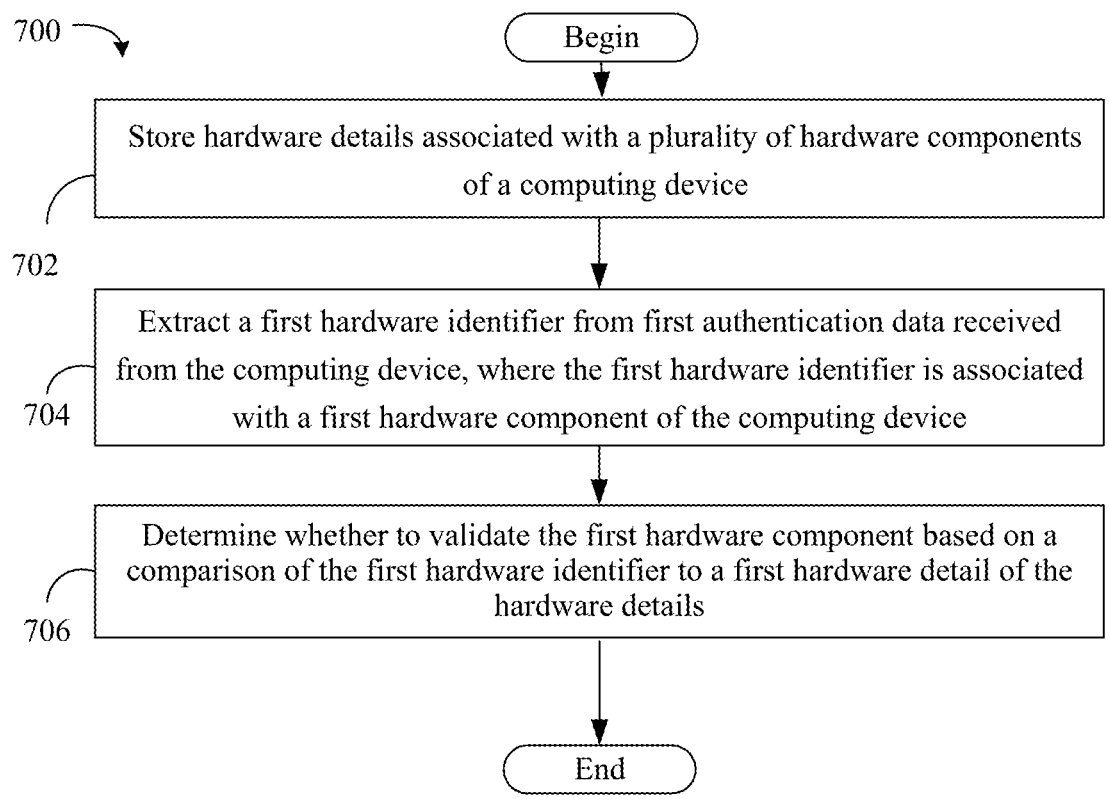
FIG. 7 illustrates a method for verifying hardware details in accordance with an embodiment in accordance with some embodiments.

FIG. 7 is a process 700 that illustrates validating a device in accordance with an exemplary embodiment. The process 700 may readily be implemented with the process 100 of FIG. 1, the computing architecture 200 of FIG. 2, the hardware element validation computing architecture 300 of FIG. 3, the authentication process 400 of FIG. 5. Process 700 may be implemented in at least one computer readable storage medium comprising a set of instructions, which when executed by a computing device, cause the computing device to execute the following steps. In some embodiments, process 700 may be executed by hardware elements (e.g., circuitry, fixed-function logic hardware, configurable logic, etc.). In some embodiments, process 700 may be implemented in combinations of hardware elements and software. Process 700 may be implemented by a server for example.

Illustrated processing block 702 stores hardware details associated with a plurality of hardware components of a computing device. Illustrated processing block 704 extracts a first hardware identifier from first authentication data received from the computing device, where the first hardware identifier is associated with a first hardware component of the computing device. Illustrated processing block 706 determines whether to validate the first hardware component based on a comparison of the first hardware identifier to a first hardware detail of the hardware details. In some embodiments, the process 700 further includes determining that the first hardware component has captured at least part of the first authentication data and identifying the first hardware detail based on an identification of a type of the first hardware component. In some embodiments, the process 700 further includes receiving an encrypted transmission from the first hardware component, wherein the encrypted transmission includes the first authentication data, and decrypting the encrypted transmission based on a decryption protocol associated with the first hardware component, wherein each of the plurality of hardware components is associated with a different decryption protocol. In some embodiments, the process 700 further includes determining that the first hardware component is to not be validated based on the first hardware detail being different from the first hardware identifier and blocking authentication of a user in response to the first hardware component not being validated. In such embodiments, the process 700 further includes providing an instruction to the computing device that the first hardware component is not validated and to select a different authentication protocol. In some embodiments, the process 700 further includes identifying second authentication data of a user, extracting a second hardware identifier from the second authentication data, wherein the second hardware identifier is associated with a second hardware component of the computing device, identifying a second hardware detail from the hardware details, validating the second hardware component based on a comparison of the second hardware detail to the second hardware identifier, and authenticating the user based on the second hardware component being validated. In some embodiments, the plurality of hardware components includes a camera device, an audio device a finger scanner and a chipset.

Figure 8:
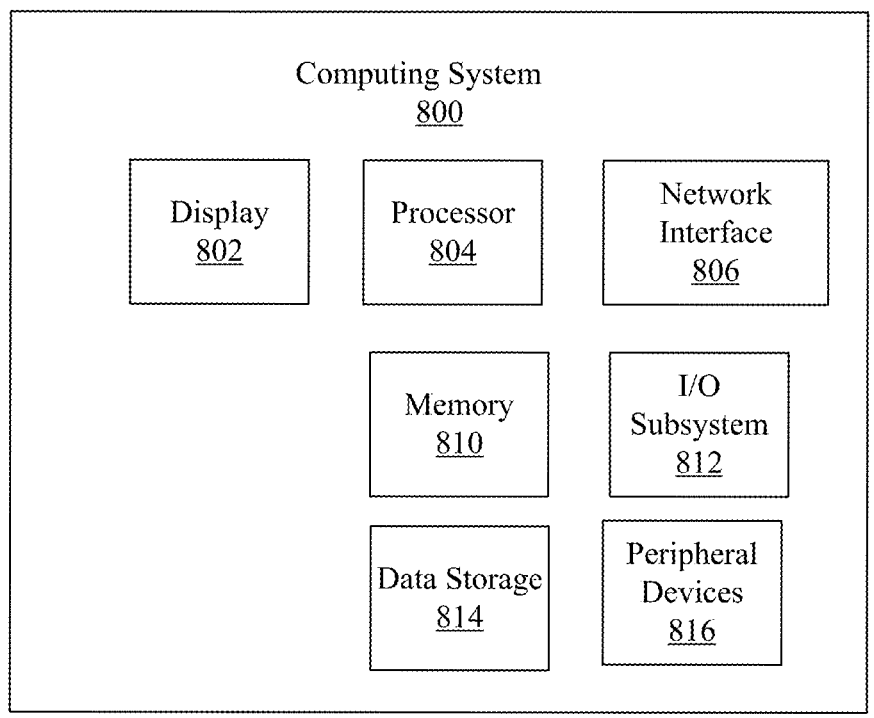
FIG. 8 illustrates block diagram of a computing system that implements conducts a validation process in accordance with some embodiments.

FIG. 8 is a block diagram of a computing system 800 that conducts a validation process as described herein. The computing system 800 (e.g., a server) may readily be implemented in the process 100 of FIG. 1, the computing architecture 200 of FIG. 2, the hardware element validation computing architecture 300 of FIG. 3, the registration process 500 of FIG. 4, the process 400 of FIG. 5, the process 600 of FIG. 6 and the process 700 of FIG. 7. The computing system 800 includes a processor 804, a memory 810, and a network interface 806.

The processor 804 includes suitable logic, circuitry, and/or interfaces to execute operations for validating hardware elements of a computing device or blocking hardware elements from proceeding. The processor 804 performs such operations by means of hardware techniques, and/or under the influence of program instructions stored in the memory 810. Examples of the processor 804 include, but are not limited to, circuitry, a fixed application-specific integrated circuit (ASIC) processor, a reduced instruction set computing (RISC) processor, a complex instruction set computing (CISC) processor, a field-programmable gate array (FPGA), a graphics processing unit and the like.

The memory 810 includes suitable logic, circuitry, and/or interfaces to store information of payment methods, validation methods, acquirers, and partner merchants. Examples of the memory 810 include a random-access memory (RAM), a read-only memory (ROM), a removable storage drive, a hard disk drive (HDD), a flash memory, a solid-state memory, and the like.

It will be apparent to a person skilled in the art that the scope of the invention is not limited to realizing the memory 810 in the computing system 800, as described herein. In another embodiment, the memory 810 may be realized in a form of a database server or a cloud storage working in conjunction with the computing system 800, without departing from the scope of the present invention.

The network interface 806 includes suitable logic, circuitry, and/or interfaces that transmit and receives data over communication networks using one or more communication network protocols under the control of the processor 804. The network interface 806 transmits/receives various requests and messages (e.g., hardware details and authentication data) to/from computing devices and/or issuers.

Examples of the network interface 806 include, but are not limited to, an antenna, a radio frequency transceiver, a wireless transceiver, a Bluetooth transceiver, an ethernet port, a universal serial bus (USB) port, or any other device configured to transmit and receive data. The network interface 806 may provide the received data to other components, such as the processor 804.

Additionally, in some embodiments, one or more of the illustrative components may be incorporated in, or otherwise form a portion of, another component. For example, the memory 810, or portions thereof, may be incorporated in the processor 804 in some embodiments. The computing system 800 may be embodied as, without limitation, a mobile computing device, a smartphone, a wearable computing device, an Internet-of-Thing's device, a laptop computer, a tablet computer, a notebook computer, a computer, a workstation, a server, a multiprocessor system, and/or a consumer electronic device.

The processor 804 may be embodied as any type of processor capable of performing the functions described herein. For example, the processor 804 may be embodied as a single or multi-core processor(s), digital signal processor, microcontroller, or other processor or processing/controlling circuit.

The memory 810 may be embodied as any type of volatile or non-volatile memory or data storage capable of performing the functions described herein. In operation, the memory 810 may store various data and software used during operation of the computing system 800 such as operating systems, applications, programs, libraries, and drivers. The memory 810 is communicatively coupled to the processor 804 via the I/O subsystem 812, which may be embodied as circuitry and/or components to facilitate input/output operations with the processor 804, the memory 810, and other components of the computing system 800.

The data storage device 814 may be embodied as any type of device or devices configured for short-term or long-term storage of data such as, for example, memory devices and circuits, memory cards, hard disk drives, solid-state drives, non-volatile flash memory, or other data storage devices. With respect to validation, the data storage device 814 may store data (e.g., computer code) to execute the processes and methods described herein. Alternatively, such data may be stored remotely. In some embodiments, the processor 804 or other hardware components may be configured to execute the processes and methods.

As shown, the computing system 800 may further include one or more peripheral devices 816. The peripheral devices 816 may include any number of additional input/output devices, interface devices, and/or other peripheral devices. For example, in some embodiments, the peripheral devices 816 may include a display, touch screen, graphics circuitry, keyboard, mouse, speaker system, microphone, network interface, and/or other input/output devices, interface devices, and/or peripheral devices. The computing system 800 may also perform one or more of the functions described in detail above.

As shown, the computing system 800 may further include a display 802. The display 802 may present details regarding various transactions to a user.

Techniques consistent with exemplary embodiments provide, among other features, systems, and methods for processing payment transactions. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments have been illustrated and described, it will be clear that the innovation is not limited to these embodiments only. Numerous modifications, changes, variations, substitutions, and equivalents will be apparent to those skilled in the art, without departing from the spirit and scope of the present invention, as described in the claims.

What is claimed is:

1. A computing system, comprising:
   a network interface to receive:
      hardware details associated with a plurality of hardware components of a computing device, and
      first authentication data of a user; and
   a processor that is configured to:
      store the hardware details;
      extract a first hardware identifier from the first authentication data, wherein the first hardware identifier is associated with a first hardware component of the computing device;
      extract biometric data from the first authentication data;
      determine a first hardware type that obtained the biometric data;
      identify a table that includes a plurality of entries storing the hardware details in association with a plurality of hardware types that includes the first hardware type, a first entry of the plurality of the entries storing the first hardware type in association with a first hardware detail of the hardware details, wherein the first hardware detail includes a unique hardware identifier;
      identify the first entry from the table based on the first hardware type;
      identify the first hardware detail from the first entry based on the first entry being identified based on the first hardware type; and
      determine whether to validate the first hardware component based on a comparison of the first hardware identifier to the first hardware detail,
   wherein the processor is hardware.

2. The computing system of claim 1, wherein the processor is further 3. configured to:
   receive an encrypted transmission from the first hardware component, wherein the encrypted transmission includes the first authentication data; and
   decrypt the encrypted transmission based on a decryption protocol associated with the first hardware component, wherein each of the plurality of hardware components is associated with a different decryption protocol.

3. The computing system of claim 1, wherein the processor is further configured to:
   determine that the first hardware component is not to be validated based on the first hardware detail being different from the first hardware identifier; and block authentication of the user in response to the first hardware component not being validated.

4. The computing system of claim 3, wherein the processor is further configured to:
provide an instruction to the computing device that the first hardware component is not validated and to select a different authentication protocol.

5. The computing system of claim 1, wherein the processor is further configured to:
identify second authentication data of the user;
extract a second hardware identifier from the second authentication data, wherein the second hardware identifier is associated with a second hardware component of the computing device;
identify a second hardware detail from the hardware details;
validate the second hardware component based on a comparison of the second hardware detail to the second hardware identifier; and
authenticate the user based on the second hardware component being validated.

6. The computing system of claim 1, wherein the plurality of hardware components includes a camera device, an audio device, a finger scanner and a chipset.

7. At least one non-transitory computer readable storage medium comprising a set of instructions, which when executed by a computing system, cause the computing system to:
store hardware details associated with a plurality of hardware components of a computing device;
extract a first hardware identifier from first authentication data received from the computing device, wherein the first hardware identifier is associated with a first hardware component of the computing device;
extract biometric data from the first authentication data;
determine a first hardware type that obtained the biometric data;
identify a table that includes a plurality of entries storing the hardware details in association with a plurality of hardware types that includes the first hardware type, a first entry of the plurality of the entries storing the first hardware type in association with a first hardware detail of the hardware details, wherein the first hardware detail includes a unique hardware identifier;
identify the first entry from the table based on the first hardware type;
identify the first hardware detail from the first entry based on the first entry being identified based on the first hardware type; and
determine whether to validate the first hardware component based on a comparison of the first hardware identifier to the first hardware detail.

8. The at least one non-transitory computer readable storage medium of claim 7, wherein the instructions, when executed, cause the computing device to:
receive an encrypted transmission from the first hardware component, wherein the encrypted transmission includes the first authentication data; and
decrypt the encrypted transmission based on a decryption protocol associated with the first hardware component, wherein each of the plurality of hardware components is associated with a different decryption protocol.

9. The at least one non-transitory computer readable storage medium of claim 8, wherein the instructions, when executed, cause the computing system to:
provide an instruction to the computing device that the first hardware component is not validated and to select a different authentication protocol.

10. The at least one non-transitory computer readable storage medium of claim 7, wherein the instructions, when executed, cause the computing system to:
determine that the first hardware component is not to be validated based on the first hardware detail being different from the first hardware identifier; and
block authentication of a user in response to the first hardware component not being validated.

11. The at least one non-transitory computer readable storage medium of claim 7, wherein the instructions, when executed, cause the computing system to:
identify second authentication data of a user;
extract a second hardware identifier from the second authentication data, wherein the second hardware identifier is associated with a second hardware component of the computing device;
identify a second hardware detail from the hardware details;
validate the second hardware component based on a comparison of the second hardware detail to the second hardware identifier; and
authenticate the user based on the second hardware component being validated.

12. The at least one non-transitory computer readable storage medium of claim 7, wherein the plurality of hardware components includes a camera device, an audio device a finger scanner and a chipset.

13. A method comprising:
storing hardware details associated with a plurality of hardware components of a computing device;
extracting a first hardware identifier from first authentication data received from the computing device, wherein the first hardware identifier is associated with a first hardware component of the computing device;
extracting biometric data from the first authentication data;
determining a first hardware type that obtained the biometric data;
identifying a table that includes a plurality of entries storing the hardware details in association with a plurality of hardware types that includes the first hardware type, a first entry of the plurality of the entries storing the first hardware type in association with a first hardware detail of the hardware details, wherein the first hardware detail includes a unique hardware identifier;
identifying the first entry from the table based on the first hardware type;
identifying the first hardware detail from the first entry based on the first entry being identified based on the first hardware type; and
determining whether to validate the first hardware component based on a comparison of the first hardware identifier to the first hardware detail.

14. The method of claim 13, further comprising:
receiving an encrypted transmission from the first hardware component, wherein the encrypted transmission includes the first authentication data; and
decrypting the encrypted transmission based on a decryption protocol associated with the first hardware component, wherein each of the plurality of hardware components is associated with a different decryption protocol.

15. The method of claim 13, further comprising:
determining that the first hardware component is not to be validated based on the first hardware detail being different from the first hardware identifier; and
blocking authentication of a user in response to the first hardware component not being validated.

16. The method of claim 15, further comprising:
providing an instruction to the computing device that the first hardware component is not validated and to select a different authentication protocol.

17. The method of claim 13, further comprising:
identifying second authentication data of a user;
extracting a second hardware identifier from the second authentication data, wherein the second hardware identifier is associated with a second hardware component of the computing device;
identifying a second hardware detail from the hardware details;
validating the second hardware component based on a comparison of the second hardware detail to the second hardware identifier; and
authenticating the user based on the second hardware component being validated.

\* \* \* \* \*